(12) United States Patent
Oliver

(10) Patent No.: US 12,035,729 B2
(45) Date of Patent: Jul. 16, 2024

(54) COFFEE BEAN INFUSION OF HEALTH AND FITNESS SUPPLEMENTS

(71) Applicant: Eterno Wellvations LLC, Miami Beach, FL (US)

(72) Inventor: Ted Kelly Oliver, Terre Haute, IN (US)

(73) Assignee: Eterno Wellvations LLC, Miami Beach, FL (US)

( * ) Notice: Subject to any disclaimer, the term of this patent is extended or adjusted under 35 U.S.C. 154(b) by 35 days.

(21) Appl. No.: 17/672,080

(22) Filed: Feb. 15, 2022

(65) Prior Publication Data

US 2023/0255227 A1     Aug. 17, 2023

(51) Int. Cl.
    *A23F 5/02*     (2006.01)

(52) U.S. Cl.
    CPC ....................... *A23F 5/02* (2013.01)

(58) Field of Classification Search
    CPC ...... A23F 5/02; A23F 5/14; A23F 5/26; A23L 33/10; A23L 25/00; A23L 25/20; A23L 15/30; B02B 1/04; A23B 7/06; A23V 2200/30; A23V 2200/00; A23V 2250/70; A23V 2250/76; A23V 2400/11; A23V 2400/21
    See application file for complete search history.

(56) References Cited

U.S. PATENT DOCUMENTS

| | | | | |
|---|---|---|---|---|
| 201,848 A | * | 3/1878 | Stowman | A23K 20/158 |
| | | | | 426/309 |
| 326,227 A | * | 9/1885 | Long | A23B 7/154 |
| | | | | 426/268 |
| 1,742,261 A | * | 1/1930 | Klein | A23F 5/36 |
| | | | | 426/594 |
| 1,821,551 A | * | 9/1931 | Kennedy | A23F 5/145 |
| | | | | 426/302 |
| 2,027,801 A | * | 1/1936 | Wilder | A23F 5/02 |
| | | | | 426/520 |

(Continued)

FOREIGN PATENT DOCUMENTS

| | | | | |
|---|---|---|---|---|
| BE | 1017855 A3 | * | 9/2009 | A23F 5/14 |
| CN | 109463507 | | 3/2019 | |

(Continued)

OTHER PUBLICATIONS

International Search Report mailed Dec. 19, 2022 Issued in PCT/US22/43991 filed on Sep. 19, 2022.

*Primary Examiner* — Erik Kashnikow
*Assistant Examiner* — Luis Eugenio Diou Berdecia
(74) *Attorney, Agent, or Firm* — Knobbe, Martens, Olson & Bear, LLP

(57) ABSTRACT

Embodiments disclose herein an enhanced form of coffee which is infused with herbal supplements to promote health and fitness to the consumer. The proposed methodology involves adding the supplement product in any form and dissolved in water and/or solvent with or without heat. A determined supplement serving amount is added to a mixing container adding the appropriate water and/or solvent appropriate to 100% coffee bean absorption and providing heat if necessary. Once required output is achieved the herbal supplements are combined with processed green coffee beans or left for absorption for maximum output and taste.

6 Claims, 3 Drawing Sheets

(56) References Cited

U.S. PATENT DOCUMENTS

| | | | | |
|---|---|---|---|---|
| 2,917,387 | A * | 12/1959 | Specht | A23B 7/16 426/309 |
| 5,362,505 | A * | 11/1994 | Hsieh | A23B 9/14 426/103 |
| 5,595,780 | A * | 1/1997 | Zook | A23L 25/20 426/607 |
| 6,045,843 | A * | 4/2000 | Gurol | A61K 33/14 426/594 |
| 6,495,180 | B1 * | 12/2002 | Gurol | A23F 5/14 426/594 |
| 8,114,458 | B2 | 2/2012 | Robinson et al. | |
| 8,734,885 | B2 * | 5/2014 | Sweeney | A23F 5/465 426/465 |
| 9,622,498 | B2 * | 4/2017 | Miller | A23L 33/15 |
| 10,800,561 | B2 | 10/2020 | Miller | |
| 2004/0265452 | A1 * | 12/2004 | Zapp | A61K 36/74 426/507 |
| 2005/0031761 | A1 * | 2/2005 | Brucker | A23L 33/105 426/595 |
| 2005/0089613 | A1 * | 4/2005 | Nair | A23L 25/30 426/482 |
| 2007/0190207 | A1 * | 8/2007 | Takahashi | A23F 5/02 426/52 |
| 2008/0008781 | A1 * | 1/2008 | Sweeney | A23L 33/16 426/534 |
| 2009/0104310 | A1 * | 4/2009 | Nakajima | A23F 5/02 426/595 |
| 2010/0310739 | A1 * | 12/2010 | Smyth | A23L 25/20 426/281 |
| 2013/0078348 | A1 * | 3/2013 | Reddy | A23L 25/25 426/632 |
| 2014/0205626 | A1 * | 7/2014 | Choi | A61K 36/062 424/776 |
| 2014/0302560 | A1 * | 10/2014 | Kelly | A23L 21/25 435/71.1 |
| 2015/0257405 | A1 * | 9/2015 | Kelly | A23F 5/02 426/595 |
| 2016/0138003 | A1 * | 5/2016 | Hendriksen | A23L 29/06 426/18 |
| 2016/0324179 | A1 * | 11/2016 | Park | A23F 5/02 |
| 2018/0192676 | A1 * | 7/2018 | Turgeon | A23L 33/14 |
| 2019/0387764 | A1 * | 12/2019 | Bassoli | A23F 5/465 |
| 2020/0296988 | A1 * | 9/2020 | Moccand | A23F 5/246 |
| 2021/0267243 | A1 * | 9/2021 | Peterson | A23F 5/50 |
| 2023/0241070 | A1 * | 8/2023 | Dietrich | A61K 31/522 424/489 |
| 2023/0284647 | A1 * | 9/2023 | Bailey | A23F 5/285 426/309 |

FOREIGN PATENT DOCUMENTS

| | | | |
|---|---|---|---|
| CN | 110139586 | 11/2021 | |
| WO | WO-9614757 A1 * | 5/1996 | ............... A23F 5/14 |
| WO | WO-2008003054 A2 * | 1/2008 | ............... A23F 5/14 |
| WO | WO 2010/117952 | 10/2010 | |
| WO | WO 2013/085629 | 6/2013 | |
| WO | WO 2022/103860 | 5/2022 | |
| WO | WO-2022103860 A1 * | 5/2022 | ............. A61K 31/05 |

* cited by examiner

COFFEE BEAN INFUSION OF HEALTH AND FITNESS SUPPLEMENTS

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Field of the Invention

The present invention relates to coffee and infusion of health & fitness supplements (i.e., vitamins & minerals, specialty supplements, herbals & botanicals, and sports nutrition & weight management) into coffee beans through a pre-roast infusion process. More specific, my invention is an advanced processing of coffee in its natural environment at the farm by adding supplements via infusion or in controlled lab setting, after farm level processing, creating an overall enhanced coffee product.

Description of the Related Art

In general, coffee is an evergreen shrub belonging to the genus *Amphoacetate*, and is grown mainly in tropical rainfalls (1,5000-2,000 mm per year), and good products are produced in high altitudes of 1,000-3,000 m above sea level. Commercially grown coffee varieties are classified into three major varieties: *arabica, robusta* and *liberica*. The main coffee beans are *arabica* and *robusta*.

The coffee as described above is a kind of multi-purpose food that is widely used all over the world. The coffee beans are roasted by the user roasting the coffee beans in the dry state (processing roasting) and then brewed coffee extracted with hot water to drink. Because the user can enjoy the unique taste and aroma of coffee beans, the user has to do the process of storing, roasting, grinding and extracting the coffee beans.

Additionally, instant coffee is manufactured by lyophilization or spray drying after evaporating the coffee extract obtained by filtering the extract through a cell filled with ground and roasted coffee. Simply dissolve it in hot water and drink it.

Furthermore, as described above, coffee was introduced in Korea around 1890, and the consumption has exploded, and it is widely used as a basic drink of our dietary culture. On the other hand, the main ingredient for flavoring coffee described above is caffeine, a vegetable alkaloid having a chemical formula of $C_8H_{10}O_2N_4$, which is colorless, odorless, and bitter. This caffeine has the effect of stimulating the central nervous system to clear the mind, promote the function of the heart, increase the amount of urine by acting as a diuretic, stimulate the stomach to promote the secretion of gastric acid.

A cup of coffee is good for the human body. Coffee is known to boost energy levels, may be linked to a lower risk of type 2 diabetes, potentially support brain health, weight management, lower risk of depression, potential protection against liver conditions, supports heart health, could increase life expectancy, and may enhance athletic performance. With all these potential health enhancements I believe coffee to be the ideal deliberant of health & fitness supplements, taking something already healthy and making it more so.

As the consumption of fresh-brewed coffee and teas has increased in the recent past, so has the public's demand for the highest quality coffee and tea available. Consequently, awareness of the availability of gourmet coffee and tea has gone from mere acceptance to outright demand. Whether at home, in a restaurant, or at a specialty beverage store, the public has come to expect quality beverages, in whatever flavor desired, made quickly and using the freshest possible ingredients.

There are multiple inventions that have been found in prior art regarding advancement in coffee/tea preparation and taste to provide enhanced usability, taste and ease to consumer. Many companies are promoting adding protein powder and other supplements to coffee via post-brew applications and even some post-roast via liquid application to the coffee bean pre-grind/brew.

The present invention is devised to solve the above-described problems, while supplementing the efficacy of herbal ingredients and maximally containing the components of the coffee beans, thus providing the consumer the same taste and aroma of the original coffee while promoting health by the ingredients which are aimed at providing health and fitness supplements.

None of the previous inventions and patents, taken either singly or in combination, is seen to describe the instant invention as claimed. Hence, the inventor of the present invention proposes to resolve and surmount existent technical difficulties to eliminate the aforementioned shortcomings of prior art.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

The primary desirable object of the present invention is to provide a novel and improved form of infusion of health and fitness supplements (i.e., vitamins & minerals, specialty supplements, herbals & botanicals, and sports nutrition & weight management) into coffee beans through a pre-roast infusion process.

It is further the objective of the invention to provide an advanced processing of coffee at farm level, in natural environment or in controlled lab setting creating an overall enhanced coffee product.

It is also the objective of the invention to infuse health & fitness supplements into green coffee beans that are able to continue to exist through the roasting, grinding and brewing processes to deliver enhanced coffee product with little to no effect in the coffee flavor or experience to the consumer.

It is further the objective of the invention to provide a daily and healthy fitness regime in addition to a novel aroma of coffee.

It is also the objective of the invention to introduce this coffee substitute as a native carrier of herb therapy thus achieving novel taste and a formulation that is biochemically cooperative.

The object of the invention is to provide a coffee bean with health supplements of the above-mentioned kind, which are simple and inexpensive in construction, manufacturing, filling and refilling.

Thus, it is the objective to provide a new and improved beans infused with health and fitness supplements. Other aspects, advantages and novel features of the present invention will become apparent from the detailed description of the invention when considered in conjunction with the accompanying drawings.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
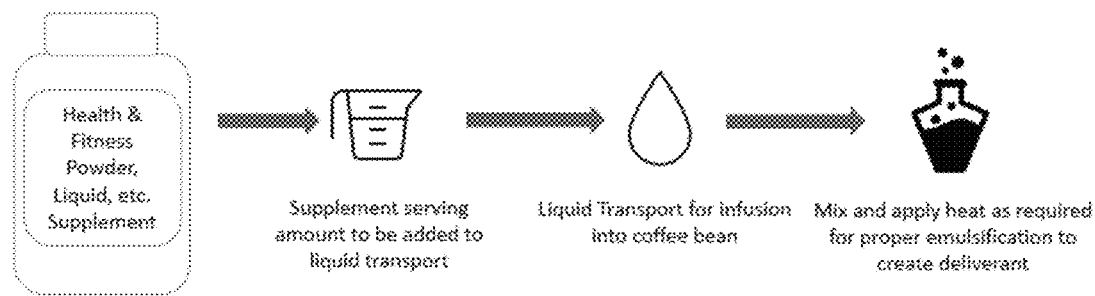
FIG. 1 is an illustration of supplements preparation process.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The present invention is directed to provide an improved coffee with health and fitness supplements, which overcomes wholly or partially one or more drawbacks of the known regular consumption of coffee. According to an embodiment, the proposed coffee provides the user same coffee flavor with additional health benefits. It requires no human intervention for additional preparations and maintains same consistency of coffee.

The human body needs more than hundred kinds of foods to stay healthy but most prior products are made of a few kinds of foods. Customers must buy many kinds of foods, calculate each, and put them together in a right way. The aroma of the present product developed from a process coaction during roasting will not only bring a novel taste to compensate nutritional balance but also cover broad individual health requirement in a simple food serving line.

Referring now to the invention in more detail, shown in FIG. 1 is a health & fitness supplement product in any form that will dissolve in water and/or a solvent with or without heat. A determined supplement serving amount is added to a mixing container adding the appropriate water and/or solvent appropriate to 100% coffee bean absorption and providing heat if necessary.

Figure 2:
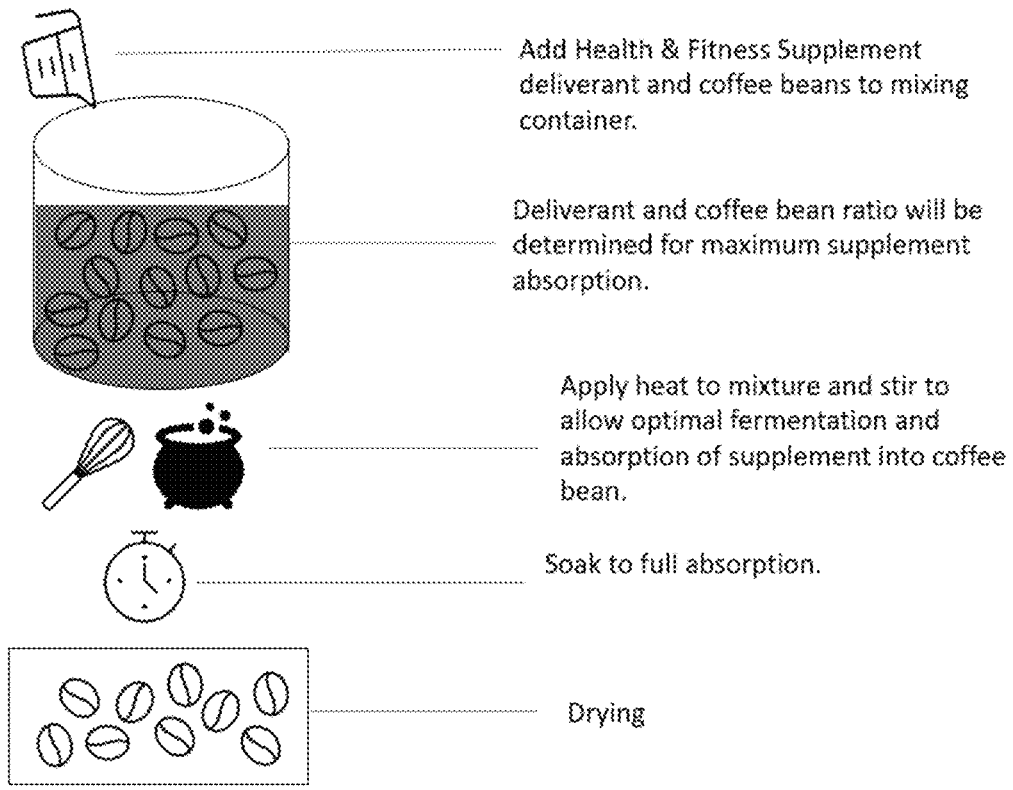
FIG. 2 is an illustration of supplement infusion process to green coffee beans.

Referring now to FIG. 2 is the process of how to infuse the supplement into the coffee by combining all the previous forementioned items with processed green coffee beans, applying heat if necessary and leaving soak until full absorption.

Figure 3:
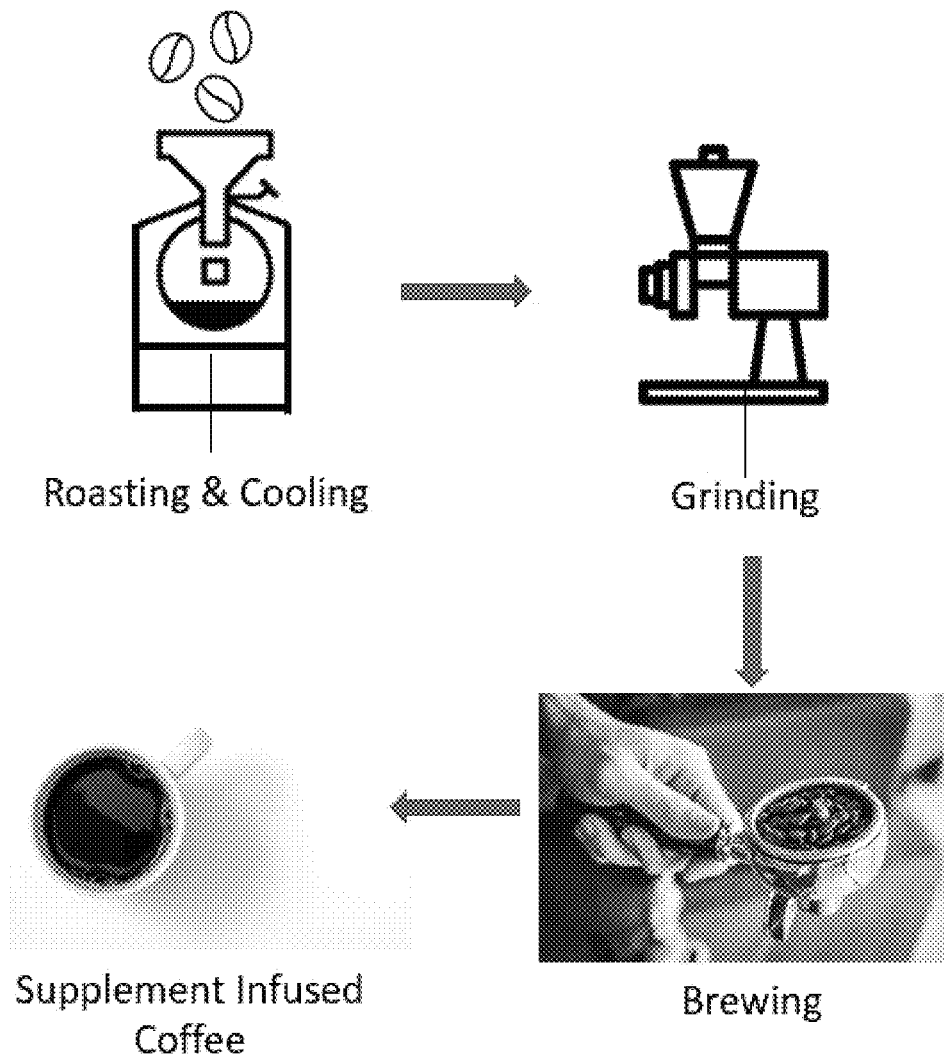
FIG. 3 is an illustration of supplement infused coffee bean drying, roasting, grinding, brewing and final product.

Referring now to FIG. 3 is the same process as a standard coffee product other than a repeated step of drying and the finalized product with the same great taste as normal coffee, however, with the added health & fitness supplements and their benefits.

The proposed invention as per its preferred embodiments involves presoaking, pressured boiling, steaming, light roasting, oil spraying, blending and grinding to achieve a tasty healthy beverage. This highly nutritional beverage can be consumed independently. This beverage can also be used as a medium to deliver herbal remedies and nutritional supplements, as well as an additive of coffee, tea or chocolate for enhancing the nutritional value of these products.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method for infusion of a vitamin into coffee, the method consisting of:
   a) mixing a vitamin with a solvent in a mixing container;
   b) adding processed green coffee beans to the mixing container to form a mixture;
   c) boiling the mixture until maximum infusion of the vitamin into the processed green coffee beans;
   d) drying the infused processed green coffee beans; and
   e) roasting the infused processed green coffee beans.

2. The method of claim 1, wherein the processed green coffee beans are unroasted coffee beans.

3. A method for infusion of a vitamin into coffee, the method consisting of:
   a) mixing a vitamin with a solvent in a mixing container;
   b) adding processed green coffee beans to the mixing container to form a mixture;
   c) boiling the mixture until maximum infusion of the vitamin into the processed green coffee beans and fermentation of the mixture;
   d) drying the fermented and infused processed green coffee beans; and
   e) roasting the fermented and infused processed green coffee beans.

4. A method for infusion of a vitamin into coffee, the method consisting of:
   a) presoaking processed green coffee beans;
   b) mixing a vitamin with a solvent in a mixing container;
   c) adding the presoaked processed green coffee beans to the mixing container to form a mixture;
   d) boiling the mixture until maximum infusion of the vitamin into the presoaked processed green coffee beans;
   e) drying the infused processed green coffee beans;
   f) roasting the infused processed green coffee beans to form roasted processed green coffee beans; and
   g) blending or grinding the roasted processed green coffee beans.

5. The method of claim 1, wherein the processed coffee beans are of an *arabica*, a *robusta* or a *liberica* variety.

6. A method for infusion of a mineral into coffee, the method consisting of:
   a) mixing a mineral with a solvent in a mixing container;
   b) adding processed green coffee beans to the mixing container to form a mixture;
   c) boiling the mixture until maximum infusion of the mineral into the processed green coffee beans;
   d) drying the infused processed green coffee beans; and
   e) roasting the infused processed green coffee beans.

* * * * *